Aug. 3, 1965 P. A. WOOSTER Re. 25,828

PAPER ROLL DISPENSER

Original Filed July 29, 1959

INVENTOR.
PHILIP A. WOOSTER

BY Flehr & Swain
ATTORNEYS

United States Patent Office

Re. 25,828
Reissued Aug. 3, 1965

25,828
PAPER ROLL DISPENSER

Philip A. Wooster, 266 Beach Road, Belvedere, Calif.

Original No. 3,032,283, dated May 1, 1962, Ser. No. 830,247, July 29, 1959. Application for reissue Apr. 20, 1964, Ser. No. 374,553
4 Claims. (Cl. 242—55.2)

Matter enclosed in heavy brackets [ ] appears in the original patent but forms no part of this reissue specification; matter printed in italics indicates the additions made by reissue.

This invention relates generally to devices for dispensing rolls of paper, such as towelling rolls, wrapping paper rolls or the like.

In winding paper rolls of the above types, different mills wind the paper web on mandrels of different diameters, whereby the axial holes provided by the mandrels vary accordingly in size. Generally the rolls have a center core of cardboard or like material, but this may be omitted in some instances. Conventional dispensers for such paper rolls consist of means for engaging and supporting the ends of the roll for rotation about its axis. With rolls having different size axial openings, it is difficult with such dispensers to maintain alignment between the axis of the roll, and the axis of the roll supporting means.

It is an object of the present invention to provide a roll dispenser in which the centering means is effective for rolls having axial openings of different diameters.

It is a further object of the invention to provide a paper roll dispenser which centers the roll on the desired axis of rotation without engaging the inner surfaces of the core.

Another object of the invention is to provide a paper roll dispenser which establishes a driving relationship between the supporting means and the roll, as well as to effect automatic centering.

Another object of the invention is to provide a paper roll dispenser in which all of the paper can be removed from the roll without interfering with the desired centering action.

Additional objects and features of the invention will appear from the following description in which the preferred embodiment has been set forth in detail in conjunction with the accompanying drawing.

Referring to the drawing.

Figure 1:
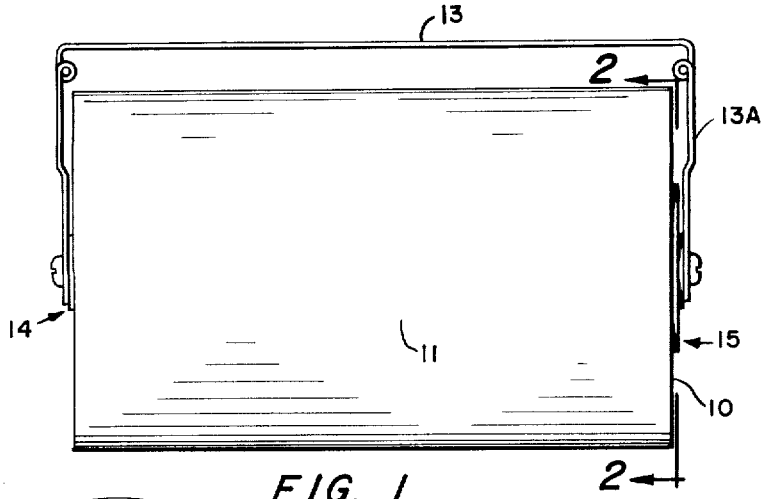
FIGURE 1 is a plan view illustrating a simple type of paper roll dispensing device, with a paper roll applied to the same.

FIGURE 1 illustrates a paper roll 10, which may be of the type commonly marketed for use as paper towelling. This roll is formed by a web 11 wrapped about the cardboard or fibreboard core 12. In same instances the core may be omitted. The simple type of dispensing device illustrated in FIGURE 1 consists of devices 14 and 15 which engage and support the ends of the roll and which in turn are rotatably carried by the panel 13.

Figure 3:
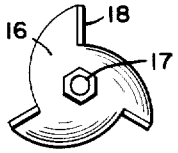
FIGURE 3 illustrates one of the devices for engaging and supporting the roll, looking towards that side of the device which faces the roll.
Figure 4:
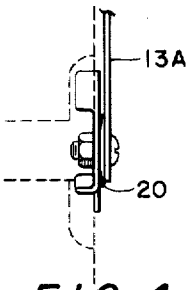
FIGURE 4 illustrates the same device as in FIGURE 3, as viewed from the right hand side of this figure, a portion of an engaged paper roll being illustrated in dotted lines.

At least one of the devices 14 and 15 (e.g. 15) is constructed as illustrated in FIGURES 3 and 4. Thus in this instance the device consists of a flat metal body 16 which is rotatably carried by a pin 17, on the supporting arm 13a. At least three finlike spurs 18 are carried by the body 16 and extend generally in planes parallel to the axis of rotation. In the particular construction illustrated, three fins 18 are provided, and the plane of each fin is coincident with the axis of the pin 17, as shown in FIGURE 3. Also the general angular spacing of the fins is equal, although this is not essential.

Figure 2:
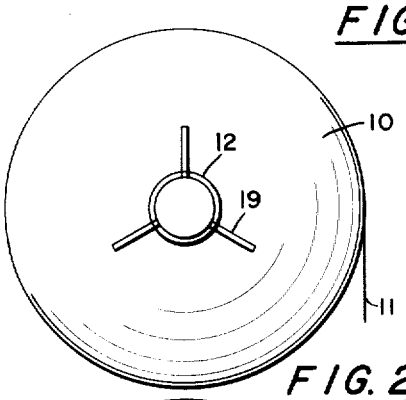
FIGURE 2 is an end view of the paper roll, showing one arrangement of slots.

The corresponding end of the paper roll 10 is shown in FIGURE 2 and is provided with a plurality of angularly spaced slots 19. These slots have the same angular spacing as the fins 18, but they have a depth and radial extent considerably greater than the width and radial length of the fins. This proportioning is illustrated in FIGURE 4.

It will be evident that the fins 18 will be accommodated within the slots 19 in the manner illustrated in FIGURE 4, with portions of the body 16 engaging the end face of the roll. Because of the proportioning, the fins will not contact either the outer end or bottoms of the slot. In other words, only their side faces are permitted to contact the side faces of the slots. Because the device of FIGURE 3 has three fins engaging in three slots, there is an inherent centering action which makes it necessary for the axis of the roll to coincide with the axis of rotation of the device 15 before the fins 18 may be accommodated within the slots.

The inherent centering action described above is a distinct features of the present invention. By virtue of this automatic centering action, which is independent of engagement with the inner surfaces of the core 12, rolls having axial holes of different diameters can be applied without changing the device 15. Furthermore because the fins 18 do not bear upon the outer ends of the slots 19 for centering, the arrangement is independent of the removal of paper, and all of the paper can be removed without affecting the centering action.

As indicated above, either one or both of the devices 14 and 15 may be constructed to cooperate with the roll in the manner illustrated in FIGURES 2–4. However, if desired, one of these devices may be of simple construction following conventional design, with portions adapted to project into the corresponding end of the core 12.

It will be apparent that the device 15 described above not only has self-centering action but also establishes driving relation with the roll. Therefore such device 15 can be connected with a mechanism such as is commonly used in paper roll dispensers for limiting or controlling the length of webbing being withdrawn. Also it may be employed in conjunction with ratchet or like means, to prevent back rotation of the roll. In FIGURE 4 I have shown a spring washer 20 interjoined between the body 16 and arm 13a. This washer may have struck-out spring tongues that are normally compressed to thereby provide some friction or drag tending to resist rotation.

Figure 5:
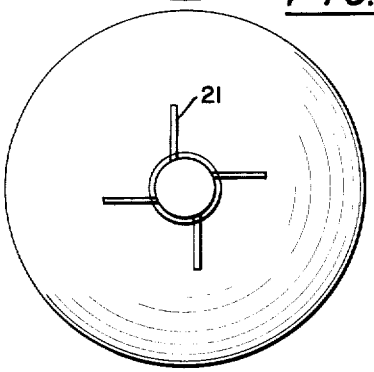
FIGURE 5 is a view like FIGURE 2 but showing another arrangement of slots.
Figure 6:
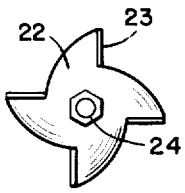
FIGURE 6 is a view like FIGURE 3, but showing another embodiment adapted to cooperate with slots as shown in FIGURE 5.
Figure 7:
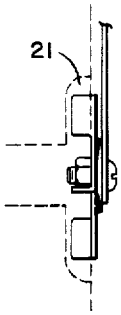
FIGURE 7 is a view like FIGURE 4, showing the embodiment of FIGURE 6.

FIGURES 5–7 illustrate another embodiment of the invention in which four fins or spurs are employed instead of three. Thus in this instance one end of the roll is provided with slots 21 that are offset from the axis of the roll. The device 15a can consist of a body 22 provided with three projecting finlike spurs 23. These fins have a positioning and angular spacing corresponding to that of the slots 21. The pivot pin 24 is shown for rotatably supporting the device 15 upon the arm 13a.

FIGURE 7 illustrates how the device of FIGURE 6 engages within the slots 21. Here again it will be noted, that the fins do not bear upon either the bottoms or the ends of the slots.

I claim:

1. In apparatus for dispensing web material in the form of a roll having an axial opening, a device for engaging and supporting one end of the roll, *said device including four angularly spaced fin like spurs forming two pairs of spurs, the spurs of each pair being parallel and offset on diametrically opposite sides of the axis of rotation of said device,* means for supporting said device for axial rotation, [said device including at least three angularly spaced fin like spurs,] said spurs being disposed along the axis of rotation, the dimensioning of the spurs in the direction of said axis being a minor fraction of the radial distance from the outer ends of the spurs to said axis, a roll of web material having *four like angularly spaced spurs* [at least three slots of like angular spacing] in said one end of the roll *for accommodating the four spurs,* said fin like spurs being accommodated within said slots and engaging the side surfaces of the slots to align the roll with the axis of said device, said device comprising a substantially flat body to which said spurs are secured, the edges of the spurs facing said roll lying in a plane substantially at right angles to said axis of rotation.

2. A device as in claim 1 in which the inner ends of said spurs are spaced outwardly from the axis of rotation.

[3. A device as defined in claim 1 wherein said device includes four angularly spaced fin like spurs forming two pairs of spurs, the spurs of each pair being parallel and offset on diametrically opposite sides of the axis of rotation of said device, and wherein said roll of web material has four angularly spaced slots on one end of said roll for accommodating the four spurs.]

*4. A roll of web material adapted at one end thereof to receive a rotatable support having a substantially flat body with four angularly spaced fin like spurs forming two pairs of spurs outstanding from the flat body and disposed about its axis of rotation with the dimension of the spurs in the direction of said axis being a minor fraction of the radial distance from the outer ends of the spurs to said axis and with the edges of the spurs remote from the flat body lying in a plane substantially perpendicular to the axis of rotation; and comprising four angularly spaced slots forming two pairs of slots in said one end of the roll, the slots of each pair being parallel and offset on diametrically opposite sides of the axis of the roll, the position of the slots being of an angular spacing to receive the spurs of the rotatable support said slots having a radial extent and depth greater than the spurs, whereby said one end of the roll may be carried on the rotatable support solely by the cooperation of the side faces of the slots with the side faces of the spurs when the axis of rotation of the support lies in a horizontal plane.*

*5. A roll of web material as defined in claim 4 wherein the inner end of said slots are spaced outwardly from the axis of the roll.*

References Cited by the Examiner

The following references, cited by the Examiner, are of record in the patented file of this patent or the original patent.

UNITED STATES PATENTS

| | | | |
|---|---|---|---|
| 2,146,038 | 2/39 | West | 242—55.53 |
| 2,303,144 | 11/42 | Stephenson | 206—58 |
| 2,380,644 | 7/45 | Grondona | 242—55.2 |
| 2,726,823 | 12/55 | Jespersen | 242—55.53 |

FOREIGN PATENTS

| | | |
|---|---|---|
| 224,352 | 7/10 | Germany. |
| 45,644 | 9/08 | Switzerland. |

MERVIN STEIN, *Primary Examiner.*